United States Patent [19]

Clotault et al.

[11] Patent Number: 5,141,244
[45] Date of Patent: Aug. 25, 1992

[54] HYDROPNEUMATIC SUSPENSION WITH VARIABLE DAMPING AND STIFFNESS

[75] Inventors: Bruno Clotault, Carrieres sur Seine; Joel Dessirieix, Gif sur Yvette, both of France

[73] Assignee: Automobiles Peugeot, Paris, France

[21] Appl. No.: 478,938

[22] Filed: Feb. 12, 1990

[30] Foreign Application Priority Data

Feb. 13, 1989 [FR] France .............................. 89 01800

[51] Int. Cl.⁵ .............................................. B60G 17/08
[52] U.S. Cl. ...................................... 280/707; 280/714; 280/6.12
[58] Field of Search ............... 280/702, 708, 711, 709, 280/714; 188/322.15, 322.14, 317

[56] References Cited

U.S. PATENT DOCUMENTS

| | | | |
|---|---|---|---|
| 3,068,023 | 12/1962 | Fiala ..................................... | 280/708 |
| 4,638,896 | 1/1987 | Poyser ........................... | 188/322.14 |
| 4,664,410 | 5/1987 | Richard ............................... | 280/714 |
| 4,773,672 | 9/1988 | Deroche ............................. | 280/708 |

FOREIGN PATENT DOCUMENTS

| | | |
|---|---|---|
| 255412 | 2/1988 | European Pat. Off. . |
| 1098063 | 3/1955 | France . |
| 2569624 | 3/1986 | France . |
| 2154300A | 9/1985 | United Kingdom . |

*Primary Examiner*—Kenneth R. Rice
*Assistant Examiner*—Karin Tyson

[57] ABSTRACT

A hydropneumatic vehicle suspension system has a cylinder with an accumulator and a damper at each wheel. There is a supplementary hydropneumatic accumulator for each axle of the vehicle and first and second supplementary dampers connected respectively between the cylinders of the wheels of an axle and the supplementary accumulator. A valve is provided for selectively switching the supplementary accumulators into and out of communication with the cylinders of the corresponding axles. Each supplementary damper has a selectively actuable throttle for varying its damping. A soft suspension is obtained when the supplementary accumulators are switched in, a medium suspension is obtained when the throttles of the supplementary dampers are also actuated, and a firm suspension is obtained when the supplementary accumulators are switched out of the circuit.

10 Claims, 2 Drawing Sheets

HYDROPNEUMATIC SUSPENSION WITH VARIABLE DAMPING AND STIFFNESS

This invention relates to a hydropneumatic suspension of an automotive vehicle, generally of the type which comprises, interposed between the chassis and the wheel support arms, cylinders connected hydraulically by dampers to hydropneumatic accumulators.

It has been proposed in U.S. Pat. No. 4,664,410 to provide each axle of such a suspension with a supplementary hydropneumatic accumulator cooperating with a first supplementary damper connected to a cylinder of one of the wheels of the axle, and a with a second supplementary damper connected to a cylinder of the other wheel of the axle.

The invention is an improvement permitting the use, according to conditions, of new types of damping. It has as an object, a suspension of the type defined above, characterized in that it comprises means for simultaneously varying the damping of first and second supplementary dampers of each axle.

The suspension which is the object of the invention is characterized also by the fact that it comprises means for throttling a calibrated axial opening provided in each supplementary damper.

Preferably, the means for throttling includes a plunger arranged to come into abutment against the damper to extend the calibrated axial opening with a narrower or smaller calibrated opening.

Advantageously, the suspension system comprises means for simultaneously connecting or switching the supplementary accumulators into and out of the circuit, and means for connecting or switching the throttling means for the supplementary dampers into and out of the circuit, Correspondingly, the suspension according to the invention allows:

a supple or flexible state corresponding to switching into the circuit the supplementary accumulators which cooperate with the supplementary dampers, but whose throttling means are out of the circuit;

an intermediate state corresponding to switching into the circuit the supplementary accumulators which cooperate with the supplementary dampers, and whose throttling means are also in the circuit, and the plungers throttle the calibrated axial openings of the supplementary dampers; and a firm or stiff state corresponding to switching the supplementary accumulators out of the circuit, and in which the throttling means of the supplementary dampers are then indifferent to being in or out of the circuit.

Other characteristics and advantages of the invention will become apparent from the detailed description given as a non-limiting example, with references to the drawing.

DETAILED DESCRIPTION

Figure 1:
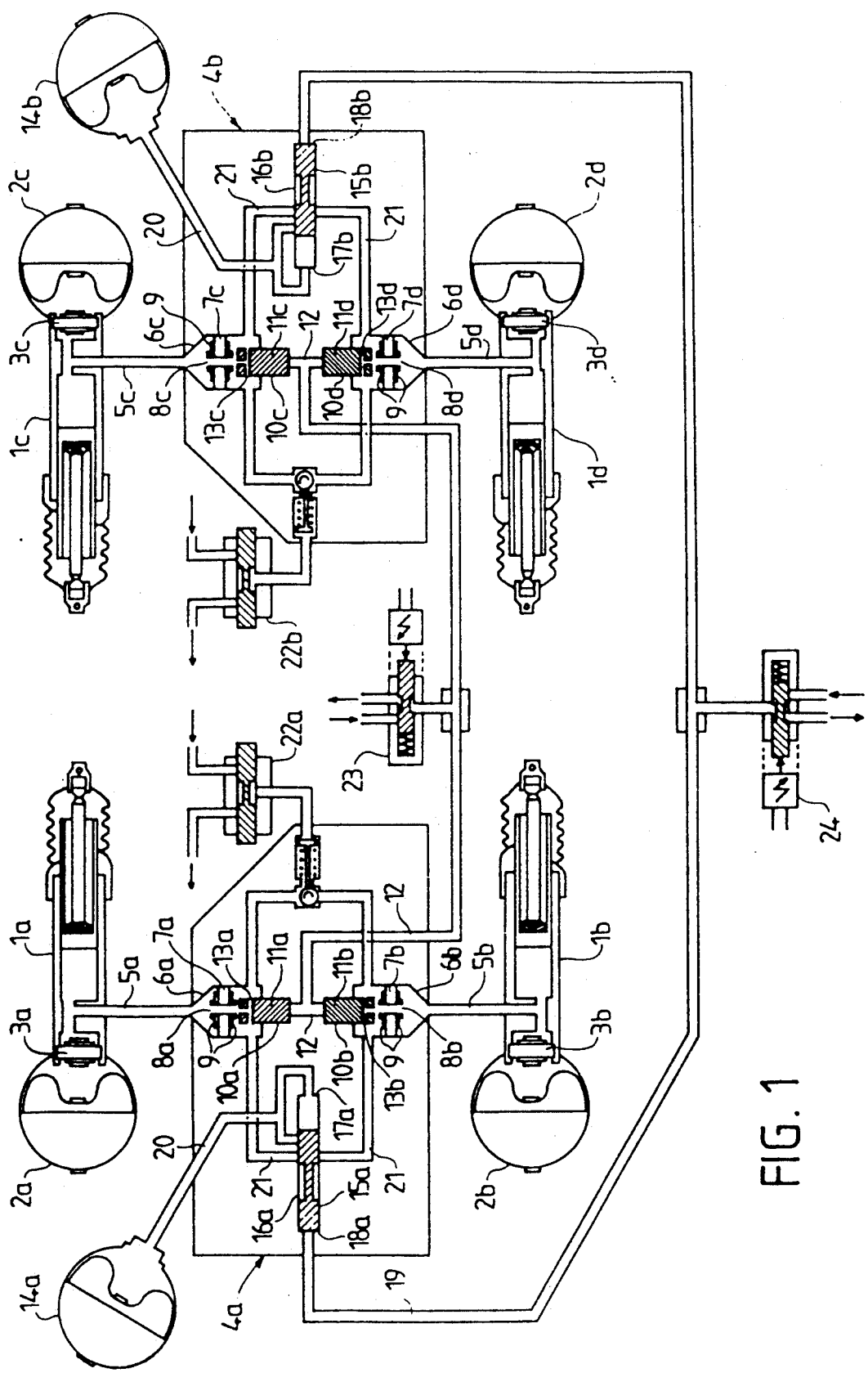
FIG. 1 schematically shows the suspension system of the invention.

As shown on FIG. 1, the suspension has four cylinders 1a, 1b, 1c, and 1d, attached respectively to the four wheels of the vehicle. These cylinders cooperate respectively with the four hydropneumatic accumulators 2a, 2b, 2c, 2d, and the damping devices 3a, 3b, 3c, 3d disposed between the accumulators and the pressure or operating chambers of the cylinders.

A first flexibility and damping means 4a is provided for the two wheels of one axle, and a second flexibility and damping means 4b is provided for the two wheels of the other axle. The conduits 5a, 5b, connect the pressure chambers of the cylinders 1a and 1b to the flexibility and damping means 4a, and the conduits 5c and 5d connect the pressure chambers of the cylinders 1c and 1d to the flexibility and damping means 4b.

The flexibility and damping means 4a has for its axle, supplementary damping chambers 6a, 6b, connected to the pressure chambers of the corresponding cylinders 1a, 1b, by the conduits 5a, 5b. The flexibility and damping means 4b has for its axle, supplementary damping chambers 6c, 6d, connected to the pressure chambers of the corresponding cylinders 1c, 1d, by the conduits 5c, 5d.

The supplementary damping chambers 6a, 6b, 6c, 6d, include respective supplementary dampers 7a, 7b, 7c, 7d, positioned so that liquid flowing through a damping chamber flows through the supplementary damper.

The supplementary dampers 7a, 7b, 7c, 7d, have respective calibrated axial openings 8a, 8b, 8c, 8d, as well as ring valves 9 on opposite sides of the openings to change the dampening flow in one direction and the other when the pressure across the damper exceeds a threshold value.

The supplementary damping chambers 6a, 6b, 6c, 6d, have on the side away from the respective conduits 5a, 5b, 5c, 5d, a housing or cylinder 10a, 10b, 10c, 10d for a plunger or piston 11a, 11b, 11c, 11d. The rearward ends of these cylinders 10a, 10b, 10c, 10d are connected to each other by a conduit 12 which can carry a high pressure, much higher than the pressure in the pressure chambers of the cylinders 1a, 1b, 1c, and 1d. When the plungers are pushed by high pressure in conduit 12, they are moved outwardly to simultaneously engage the supplementary dampers 7a, 7b, 7c, 7d, in a manner to extend the calibrated axial openings 8a, 8b, 8c, 8d of the dampers with calibrated T shaped passages or openings 13a, 13b, 13c, 13d of smaller effective diameter which have the effect of modifying the damping of the supplementary dampers. When the plungers are so actuated, the passages 13a, 13b, 13c, 13d throttle and further restrict flow of liquid through the supplementary dampers.

Apparatus 4a has a supplementary accumulator 14a, and a slide valve 15a movable in a casing 16a having one end 17a connected to supplementary accumulator 14a. Similarly, apparatus 4b has a supplementary accumulator 14b and a slide valve 15b movable in a casing 16b having one end 17b connected to the supplementary accumulator 14b.

The other ends 18a, 18b of the casings 16a, 16b of valves 15a and 15b are connected to a conduit 19 into which high pressure can be introduced to displace the slide valves against the pressure of the corresponding supplementary accumulator.

When the slide valves 15a, 15b are displaced by high pressure in the conduit 19, the valves move from the positions shown in the drawing, to inward positions to put conduits 21 in communication with the conduits 20. The supplementary accumulator 14a is then in communication with the cylinders 1a, 1b of the corresponding axle through the respective supplementary dampers 7a, 7b, and the supplementary accumulator 14b is in communication with the cylinders 1c, 1d of the other axle through the respective supplementary dampers 7c, 7d.

Each axle has a height corrector. Height corrector 22a varies the volume of the liquid in the circuits of the cylinders 1a, 1b, according to the height of its axle. Height corrector 22b varies the volume of the liquid in the circuits of the cylinders 1c, 1d, according to the height of its axle. The correctors 22a, 22b are connected to the chambers 6a, 6b, 6c, 6d of the corresponding axles such that the supplementary dampers (7a, 7b, 7c, 7d) are between the height correctors and the pressure chambers of the cylinders for each axle.

Figure 2A:
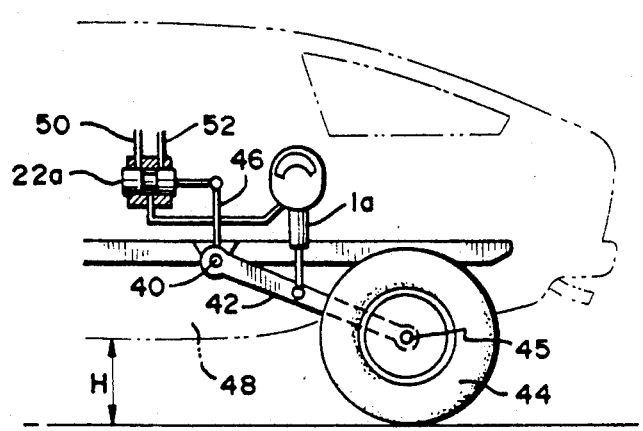
FIGS. 2a, 2b, and 2c illustrate diagrammatically the operation of a conventional hydropneumatic suspension of the type disclosed herein.
Figure 2B:
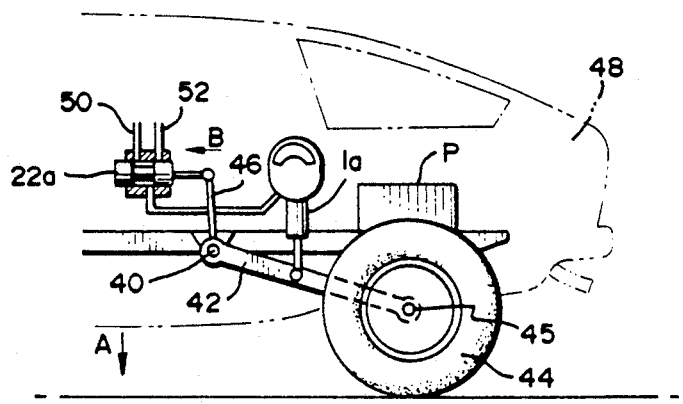
Figure 2C:
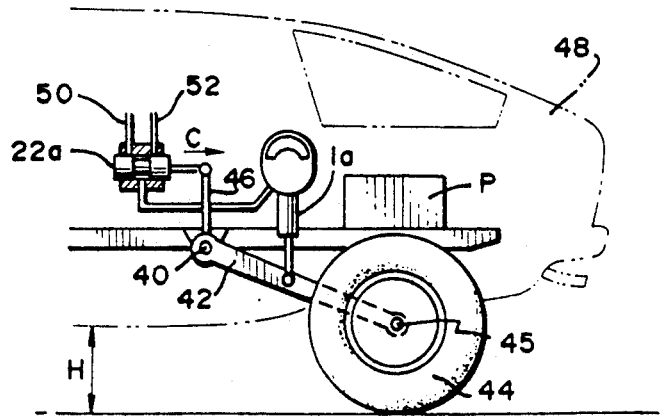

An example of a height corrector operating arrangement is shown as FIGS. 2a, 2b, and 2c. A bar 40 is fixed to the end of a pivoting support arm 42. A wheel 44 is on an axle 45 at the other end of the arm 42. A link 46 pivoted on the end of the bar 40 is connected to the height control valve 22a. When the vehicle body 48 is at a predetermined height H relative to the axle 45, the valve 22a is in the center position shown at FIGS. 1 and 2a. When a load P is added to the vehicle, the body 48 drops as indicated by arrow A causing the support arm 42 to pivot anti-clockwise relative to the body 48. The valve 22a then moves in the direction B to the position in FIG. 2b in which pressure fluid is added to the cylinder 1a from the high pressure line 50 which raises the vehicle body 48 and moves the arm 42 clockwise relative to the vehicle body 48 so the valve 22a moves in the direction C to the position in FIG. 2c until the vehicle body 48 reaches its previous height H and the vehicle body 48 stops rising. It may thus be understood that all movements are reverse when the load is removed. A return line 52 permits return of pressure fluid to reservoir in the event that valve 22a should move farther in direction C than shown in FIG. 2c.

A first solenoid valve 23 operable manually or by characteristic parameters of the state of the vehicle, controls admission or escape of high pressure to the conduit 12. When high pressure is admitted to conduit 12, the plungers 11a, 11b, 11c, 11d, are simultaneously displaced outwardly and modify the damping of the supplementary dampers 7a, 7b, 7c, 7d. When the pressure is released, the plungers return to their normal positions in which the damping of the supplementary dampers is unmodified.

A second solenoid valve 24 operable manually or by characteristic parameters of the state of the vehicle, controls admission or escape of high pressure to the conduit 19. When high pressure is admitted to conduit 19, the slide valves 15a and 15b are simultaneously forced inwardly to communicate the supplementary accumulators with the cylinders at the wheels of the respective axles.

OPERATION

The drawing shows the positions of the valves and controls of the suspension system in the FIRM condition in which none of the controls are operated. In this FIRM condition, the accumulators 14a and 14b are out of the circuit because valves 16a, 16b are in their outer positions in which flow of fluid to or from the supplementary accumulators 14a, 14b, is blocked. Thus, the cylinders 1a, 1b, 1c, 1d, communicate with their respective accumulators 2a, 2b, 2c, 2d. The plungers 16a, 16b, 16c, and 16d are retracted, but could be extended, since there is no flow through the supplementary dampers 7a, 7b, 7c, 7d, when valves 16a, 16b, are in the outer positions.

For a soft or supple condition, valve 24 is actuated to introduce high pressure into conduit 19 to shift the valves 18a and 18b to inward positions in which the accumulators 14a and 14b communicate with the cylinders at supplementary dampers (7a, 7b, 7c, 7d). The throttling means are inactive in this soft or supple ride condition.

Actuating valve 23 to introduce high pressure into conduit 12 (while high pressure is present in conduit 19 and the supplementary accumulators are in circuit) provides an intermediate or medium stiffness suspension.

The height correctors 22a and 22b act independently of each other and sense a desired average height depending on the average height of the front and rear of the chassis relative to its axle. Thus, when a load is added to the vehicle which causes the chassis to move lower, the height correctors add liquid to the cylinders to return the chassis to its original determined height.

Correspondingly, the suspension according to the invention allows:

a supple or flexible state corresponding to switching into the circuit the supplementary accumulators which cooperate with the supplementary dampers but whose throttling means are out of the circuit or inactive;

an intermediate or medium stiff state corresponding to switching into the circuit the supplementary accumulators which cooperate with the supplementary dampers and whose throttling means are in the circuit and the plungers throttle the calibrated axial opening of the supplementary dampers; and a firm or stiff state corresponding to switching the supplementary accumulators out of the circuit, and in which the throttling means of the supplementary dampers are either in or out of the circuit.

The invention is not limited to the embodiment shown and described but covers variations. For example, the plungers can be replaced with other throttling means in the dampers such as axially slidable tubes to uncover the openings for varying the damper flow. In addition, the solenoid valves can be replaced by mechanical or electromechanical means acting on the slide valves and the plungers.

We claim:

1. Hydropneumatic vehicle suspension system comprising, a cylinder at each wheel connected between a wheel support and the structure of the vehicle, each cylinder having an accumulator and a damper, a supplementary hydropneumatic accumulator for each axle of the vehicle, a first supplementary damper connected between the cylinder of one of the wheels of an axle and the supplementary accumulator for the axle, a second supplementary damper connected between the cylinder of another wheel of the axle and the supplementary accumulator for the axle, means for selectively switching the supplementary accumulators into and out of communication with the cylinders of the corresponding axles, and selectively actuable means for simultaneously varying the damping of the first and second supplementary dampers of each axle.

2. A suspension according to claim 1 wherein said supplementary dampers each comprise, a calibrated axial orifice, and said means for simultaneously varying the damping of the supplementary dampers comprises means to throttle flow through said orifices of said supplementary dampers.

3. A suspension according to claim 2 wherein said means to throttle flow through said orifices of said supplementary dampers each comprise, a plunger having a narrow passage, and displaceable into engagement with the supplementary damper to extend the calibrated orifice with the passage.

4. A suspension according to claim 3 further comprising selectively operable hydraulic means for displacing the plungers into engagement with the supplementary dampers against the action of the pressure in a corresponding cylinder of a wheel.

5. A suspension according to claim 4 comprising a common hydraulic circuit connected to the hydraulic means of all said plungers of the supplementary dampers, and valve means actuable to a first condition for simultaneously applying high pressure to said hydraulic means to displace the plungers into engagement with the supplementary dampers, and actuable to a second condition for simultaneously venting high pressure from said hydraulic means to allow said plungers to retract.

6. A suspension according to claim 1 wherein said means for selectively switching the supplementary accumulators into and out of communication with the cylinders of the corresponding axles comprises, at least one control valve displaceable in a casing and movable to a first position in which the accumulator is out of communication with the cylinders, in response to pressure of the accumulator, and to a second position in which the accumulator communicates with the cylinders, in response to a high pressure acting in opposition to the pressure of the accumulator, and means for selectively applying a high pressure to said valve.

7. A suspension according to claim 6 further comprising first and second control valves, one for each supplementary accumulator, and wherein said means for selectively applying a high pressure comprises a common hydraulic circuit for applying high pressure to said first and second valves.

8. A suspension according to claim 1 further comprising a height corrector for each axle connected to the cylinders of the axle through the supplementary dampers.

9. A suspension according to claim 2 wherein,
switching said supplementary accumulators into communication with the corresponding cylinders provides a soft suspension,
switching said supplementary accumulators into communication with the corresponding cylinders and activating said means to throttle flow through the supplementary dampers provides a medium suspension, and
switching said supplementary accumulators out of communication with the cylinders provides a first suspension.

10. A suspension according to claim 5, wherein said valve means comprises a solenoid actuated valve.

* * * * *

UNITED STATES PATENT AND TRADEMARK OFFICE
CERTIFICATE OF CORRECTION

PATENT NO. : 5,141,244
DATED : August 25, 1992
INVENTOR(S) : Bruno CLOTAULT et al It is certified that error appears in the above-identified patent and that said Letters Patent is hereby corrected as shown below:

On title page, item [73] Assignee: should read as follows;

Automobiles Peugeot, Paris;

Automobiles Citroen, Neuilly sur Seine, both of France

On title page, add the following;
Attorney, Agent, or Firm--WONG & HUSAR

Signed and Sealed this

Sixteenth Day of November, 1993

Attest:

BRUCE LEHMAN

Attesting Officer     Commissioner of Patents and Trademarks